(12) United States Patent
Osamura et al.

(10) Patent No.: US 9,287,811 B2
(45) Date of Patent: Mar. 15, 2016

(54) ELECTRIC MOTOR CONTROL DEVICE

(71) Applicant: Calsonic Kansei Corporation, Saitama (JP)

(72) Inventors: Kensuke Osamura, Saitama (JP); Yousuke Ooneda, Saitama (JP); Mitsuo Hirata, Tochigi (JP); Hayato Suzuki, Tochigi (JP)

(73) Assignee: CALSONIC KANSEI CORPORATION, Saitama (JP)

( * ) Notice: Subject to any disclaimer, the term of this patent is extended or adjusted under 35 U.S.C. 154(b) by 0 days.

(21) Appl. No.: 14/379,674

(22) PCT Filed: Feb. 4, 2013

(86) PCT No.: PCT/JP2013/000602
§ 371 (c)(1),
(2) Date: Aug. 28, 2014

(87) PCT Pub. No.: WO2013/128799
PCT Pub. Date: Sep. 6, 2013

(65) Prior Publication Data
US 2015/0091483 A1 Apr. 2, 2015

(30) Foreign Application Priority Data
Feb. 28, 2012 (JP) ................. 2012-041661

(51) Int. Cl.
*H02P 6/00* (2006.01)
*H02P 29/00* (2006.01)
(Continued)

(52) U.S. Cl.
CPC *H02P 6/06* (2013.01); *H02P 6/002* (2013.01); *H02P 21/0042* (2013.01); *H02P 21/141* (2013.01); *H02P 21/146* (2013.01); *H02P 2207/05* (2013.01)

(58) Field of Classification Search
CPC ... H02P 21/146; H02P 21/04; H02P 21/0032; H02P 21/0035; H02P 21/0039; H02P 21/0053; H02P 2203/11; H02P 2207/01; H02P 23/14; H02P 6/16; H02P 6/183; H02P 6/185; H02P 21/0042; H02P 21/13
USPC ............ 318/400.25, 400.32, 400.33, 400.02; 702/147
See application file for complete search history.

(56) References Cited

U.S. PATENT DOCUMENTS 4,891,588 A * 1/1990 Fujioka et al. ................ 324/166
6,639,380 B2 * 10/2003 Sul et al. ....................... 318/727
(Continued)

FOREIGN PATENT DOCUMENTS

JP 2009-290962 A 12/2009
JP 2010-088200 A 4/2010

OTHER PUBLICATIONS

Office Action from Japanese Patent Office in corresponding Japanese Patent Application No. 2012-041661, dated Jul. 28, 2015 (4 pages).

*Primary Examiner* — Paul Ip
(74) *Attorney, Agent, or Firm* — Thomas Engellenner; Reza Mollaaghababa; Pepper Hamilton LLP (57) ABSTRACT

An electric motor control device is capable of reducing vibration in a speed fluctuation range at a high frequency. The electric motor control device includes a target rotation speed setting unit that sets the target rotation speed of an electric motor, a rotation speed estimation unit that calculates an estimated rotation speed of the electric motor, and a drive command signal generation unit that generates a drive command signal for the electric motor so as to eliminate a rotation speed difference between the target rotation speed and the estimated rotation speed. The rotation speed estimation unit includes an error calculation unit that calculates an error related to rotation of the electric motor and an estimated corrected rotation speed calculation unit that calculates an estimated corrected rotation speed by taking the error as input and correcting the estimated rotation speed.

6 Claims, 9 Drawing Sheets

(51) Int. Cl.
*H02P 27/06* (2006.01)
*H02P 6/06* (2006.01)
*H02P 21/00* (2006.01)
*H02P 21/14* (2006.01)

(56) References Cited

U.S. PATENT DOCUMENTS

| | | | |
|---|---|---|---|
| 7,068,001 | B2 * | 6/2006 | Okumatsu et al. ....... 318/400.39 |
| 7,245,104 | B2 * | 7/2007 | Tomigashi et al. ........... 318/705 |
| 7,265,934 | B2 * | 9/2007 | Takaishi ..................... 360/77.04 |
| 8,154,231 | B2 * | 4/2012 | Komatsu et al. ......... 318/400.06 |
| 8,159,161 | B2 * | 4/2012 | Tomigashi ............... 318/400.02 |
| 2003/0006723 | A1 * | 1/2003 | Sul et al. ...................... 318/127 |
| 2003/0009309 | A1 * | 1/2003 | Lee ................................ 702/147 |
| 2005/0110442 | A1 * | 5/2005 | Trifilo ........................... 318/254 |
| 2006/0022628 | A1 * | 2/2006 | Okumatsu et al. ........... 318/437 |
| 2006/0291101 | A1 * | 12/2006 | Takaishi ....................... 360/244 |
| 2007/0018603 | A1 * | 1/2007 | Aleyt et al. .................. 318/609 |
| 2007/0040528 | A1 * | 2/2007 | Tomigashi et al. ........... 318/650 |
| 2009/0190903 | A1 * | 7/2009 | Komatsu et al. .............. 388/803 |
| 2009/0219646 | A1 * | 9/2009 | Ishihara et al. ................. 360/75 |
| 2010/0045218 | A1 * | 2/2010 | Tomigashi ............... 318/400.02 |
| 2012/0326704 | A1 * | 12/2012 | Atay ............................. 324/177 |
| 2012/0326705 | A1 * | 12/2012 | Atay ............................. 324/177 |
| 2012/0330595 | A1 * | 12/2012 | Atay ............................... 702/96 |
| 2013/0069572 | A1 * | 3/2013 | Maekawa ................ 318/400.14 |

* cited by examiner

ELECTRIC MOTOR CONTROL DEVICE

CROSS REFERENCE TO RELATED APPLICATIONS

This application is a National Stage filing under 35 U.S.C. §371 of PCT/JP2013/000602 filed on Feb. 4, 2013, which claims the benefit of Japanese Application No. 2012-041661, filed Feb. 28, 2012, the contents of which are incorporated herein by reference in their entireties.

TECHNICAL FIELD

The present invention relates to an electric motor control device.

BACKGROUND ART

For example, when controlling a synchronous motor that drives an electric compressor in an automobile air conditioner, periodic speed fluctuation occurs as a result of torque fluctuation due to the compressor's compression cycle. Periodic speed fluctuation causes vibrations and noise. This phenomenon is prominent in a vane compressor, and periodic load fluctuation occurs in proportion to the number of vanes during the compression process. As a result, the speed fluctuation of the motor driving the compressor ends up increasing.

Since such torque fluctuation in the compressor is periodic, methods such as a disturbance observer or repetitive control may be applied to reduce the torque fluctuation. In general, however, vibration becomes more difficult to suppress as the vibration frequency increases.

On the other hand, electric motors have been controlled by detecting the rotation position of the rotor in the motor with a sensor, yet this leads to problems such as a larger device (larger outer frame dimensions of the motor, in particular the axial length) and higher costs. Therefore, position sensorless control has recently been applied.

Position sensorless control, however, is affected by speed estimation characteristics, making suppression of vibration difficult.

The present applicant thus proposed the electric motor control device disclosed in Patent Literature 1.

The electric motor control device disclosed in Patent Literature 1 is provided with a first command current setting unit that sets a first command current of a motor to reduce a rotation speed error, a second command current setting unit that sets a second command current of the motor based on a load fluctuation frequency of the motor, a third command current setting unit that sets a third command current of the motor using the first command current and the second command current, and an inverter switching pattern generation unit that generates a drive command for the motor from at least the third command current and the actual rotation speed.

In the second command current setting unit, a peak filter having the above load fluctuation frequency as the peak frequency is inserted in parallel with a speed PI controller, the above rotation speed error is input into the peak filter, and the output of the peak filter is the second command current.

By using such a peak filter that takes the difference in speed between the target rotation speed and the estimated rotation speed as input, it is possible to suppress the periodic speed fluctuation in the vibration frequency of the motor, thereby improving the estimation accuracy of the rotation speed.

CITATION LIST

Patent Literature

Patent Literature 1: JP2010-88200A

SUMMARY OF INVENTION

The above conventional electric motor control device, however, has the following problem.

Namely, with the electric motor control device disclosed in Patent Literature 1, a suppression effect is achieved for a vibration frequency (speed fluctuation) of up to approximately 100 Hz even with the above position sensorless control, yet at a higher vibration frequency, the suppression effect decreases, making the need for further improvement clear.

The present invention has been conceived in light of the above problems, and it is an object thereof to provide an electric motor control device that can reduce vibration in a high frequency range of rotational fluctuation when controlling an electric motor with position sensorless control.

To achieve this object, an electric motor control device according to the present invention as recited in claim 1 includes a target rotation speed setting unit configured to set a target rotation speed of an electric motor; a rotation speed estimation unit configured to calculate an estimated rotation speed of the electric motor; and a drive command signal generation unit configured to generate a drive command signal for the electric motor so as to eliminate a rotation speed difference between the target rotation speed and the estimated rotation speed, the rotation speed estimation unit including: an error calculation unit configured to calculate an error related to rotation of the electric motor; and an estimated corrected rotation speed calculation unit configured to calculate an estimated corrected rotation speed by taking the error calculated by the error calculation unit as input and correcting the estimated rotation speed.

The electric motor control device as recited in claim 2 is the electric motor control device as recited in claim 1, such that the error related to rotation is an angle error.

The electric motor control device as recited in claim 3 is the electric motor control device as recited in claim 1 or 2, such that a first peak filter is used in the estimated corrected rotation speed calculation unit.

The electric motor control device as recited in claim 4 is the electric motor control device as recited in any one of claims 1 to 3, such that the drive command signal generation unit includes a second peak filter taking a rotation speed difference between the target rotation speed and the estimated corrected rotation speed as input.

The electric motor control device as recited in claim 5 is the electric motor control device as recited in any one of claims 1 to 3, such that a rotation speed difference between the target rotation speed and the estimated corrected rotation speed includes a corrected value determined in accordance with output of the estimated corrected rotation speed calculation unit.

According to the electric motor control device as recited in claim 1, the estimated corrected rotation speed calculation unit that takes the error as input suppresses the periodic speed fluctuation component included in the estimated rotation speed, so that vibration can be further reduced in a high frequency range when controlling an electric motor by position sensorless control.

According to the electric motor control device as recited in claim 2, by having the error be angle error, it is possible to calculate the estimated corrected rotation speed easily by using a peak filter or the like in the estimated corrected rotation speed calculation unit.

According to the electric motor control device as recited in claim 3, by configuring the estimated corrected rotation speed calculation unit with the first peak filter, it is possible to calculate the estimated corrected rotation speed easily.

According to the electric motor control device as recited in claim 4, by using the second peak filter for calculation of the rotation speed difference between the target rotation speed and the estimated corrected rotation speed, it is possible to reduce vibration further in an even higher frequency range.

According to the electric motor control device as recited in claim 5, by using the second peak filter that takes the rotation speed difference between the target rotation speed and the estimated corrected rotation speed as input, it is possible to reduce vibration further in an even higher frequency range.

BRIEF DESCRIPTION OF DRAWINGS

The present invention will be further described below with reference to the accompanying drawings, wherein.

DESCRIPTION OF EMBODIMENTS

The following describes the present invention in detail based on the embodiments illustrated in the drawings.

Embodiment 1

First, the overall structure of an electric motor control device according to Embodiment 1 of the present invention is described.

By performing position sensorless control, the electric motor control device of Embodiment 1 controls an Interior Permanent Magnet Synchronous Motor (IPMSM) that drives the compressor in an automobile air conditioner.

Figure 1:
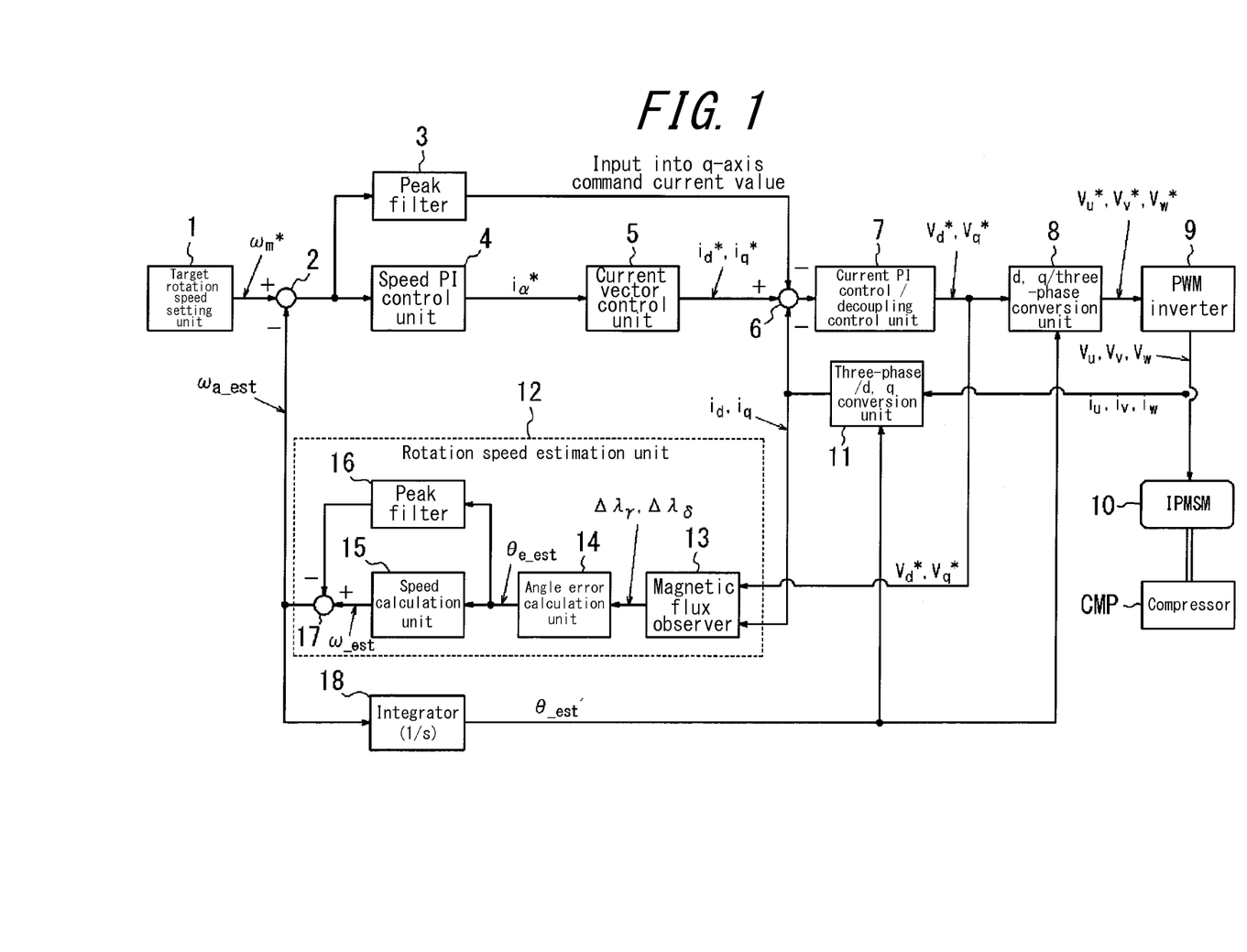
FIG. 1 is a functional block diagram of an electric motor control device according to Embodiment 1 of the present invention.

As illustrated in FIG. 1, the electric motor control device of Embodiment 1 includes a target rotation speed setting unit 1, a subtractor 2, a peak filter 3, a speed PI (proportional and integral) control unit 4, a current vector control unit 5, a subtractor 6, a current PI control/decoupling control unit 7, a d, q/three-phase conversion unit 8, and a Pulse Width Modulation (PWM) inverter 9. The PWM inverter 9 is connected to an IPMSM 10.

The output shaft of the IPMSM 10 is connected to a vane compressor CMP for an air conditioner, and the IPMSM 10 can drive the compressor CMP.

The electric motor control device of Embodiment 1 further includes a three-phase/d, q conversion unit 11, a rotation speed estimation unit 12, and an integrator (1/s) 18.

Next, each of the above components is described in greater detail.

Note that in the following explanation, the superscript * for a signal indicates a target value, and the subscript _est for a signal indicates an estimated value.

First, the target rotation speed setting unit 1 calculates and sets the target rotation speed of the IPMSM 10 that is the control target.

In other words, so that the temperature of air that has passed through the evaporator of the automobile air conditioner becomes a predetermined value, the target rotation speed setting unit 1 compares the detected actual air temperature with the target air temperature and sets a motor command rotation speed $\omega_m^*$, which is the target rotation speed during PI control. The target rotation speed setting unit 1 inputs the motor command rotation speed $\omega_m^*$ into the subtractor 2.

The subtractor 2 subtracts a motor estimated corrected rotation speed $\omega_{a\_est}$ obtained by the rotation speed estimation unit 12 from the motor command rotation speed co; of the motor input from the target rotation speed setting unit 1 to yield a rotation speed difference (error). The subtractor 2 inputs this rotation speed difference into the peak filter 3 and the speed PI control unit 4.

The peak filter 3 is inserted in parallel with the speed PI control unit 4 and the current vector control unit 5, which is in series with the speed PI control unit 4, so as to reject the periodic disturbance. The transfer function $K_{pk}$ of the peak filter 3 is defined by the following equation, using the model for periodic disturbance and a gain k that determines the convergence of tracking error and the stability of the control system.

$$K_{pk} = \frac{k\omega_{pk}}{s^2 + \omega_{pk}^2}$$

In this equation, $\omega_{pk}$ is the resonance frequency, and s is the Laplace operator (complex number). The gain k of the peak filter 3 is a parameter determined by considering the tradeoff between convergence of tracking error and stability of the control system over a range in which the control system does not become unstable (i.e. the gain k should be made sufficiently small).

The peak filter 3 multiplies the above rotation speed difference by the transfer function $K_{pk}$ to calculate a filter command current value and inputs the filter command current value to the subtractor 6 so that the filter command current value is subtracted from a q-axis command current value.

Note that the peak filter 3 corresponds to the second peak filter of the present invention.

By performing PI control using proportional gain and integral gain constants in the rotational speed difference input from the subtractor 2, the speed PI control unit 4 calculates a command motor current value $i_\alpha{}^*$, which is the target current value, and inputs this value into the current vector control unit 5.

The current vector control unit 5 separates the command motor current value $i_\alpha{}^*$ input from the speed PI control unit 4 into a d-axis command current value $i_d{}^*$ and a q-axis command current value $i_q{}^*$ along a rotating orthogonal coordinate (d-q coordinate) system that rotates in synchronization with the magnetic flux vector in the IPMSM 10. It is thus possible to treat the alternating current component as a direct current component, as in a direct current motor.

With this vector conversion, instantaneous control and high precision control of an alternating current motor are possible. The current vector control unit 5 inputs the d-axis command current value $i_d{}^*$ and the q-axis command current value $i_q{}^*$ into the subtractor 6.

From the d-axis command current value $i_d{}^*$ and the q-axis command current value $i_q{}^*$ input from the current vector control unit 5, the subtractor 6 subtracts the filter command current value obtained by the peak filter 3 and d-axis and q-axis current values $i_d$ and $i_q$ obtained by the three-phase/d, q conversion unit 11 to yield a corrected command current value. The subtractor 6 inputs this value into the current PI control/decoupling control unit 7.

Based on the corrected command current value obtained by the subtractor 6, the current PI/decoupling control unit 7 performs current PI control and performs decoupling control to eliminate the interaction between the d and q axes (control to completely separate the I/O relationship so as to be one-to-one). The current PI/decoupling control unit 7 thus calculates a d-axis command voltage value $v_d{}^*$ and a q-axis command voltage value $v_q{}^*$, inputting these values into the d, q/three-phase conversion unit 8 and a magnetic flux observer 13 in the rotation speed estimation unit 12.

While referring to an estimated angle $\theta_{\_est}$ of the rotor input from the integrator 18, the d, q/three-phase conversion unit 8 converts the d-axis command voltage value $v_d{}^*$ and the q-axis command voltage value $v_q{}^*$ obtained by the current PI/decoupling control unit 7 into three-phase, i.e. u-phase, v-phase, and w-phase command voltage values $v_u{}^*$, $v_v{}^*$, and $v_w{}^*$. The d, q/three-phase conversion unit 8 then inputs these command voltage values into the PWM inverter 9.

The PWM inverter 9 creates three-phase, i.e. u-phase, v-phase, and w-phase, voltage values $v_u$, $v_v$, and $v_w$ from the three-phase command voltage values $v_u{}^*$, $v_v{}^*$, and $v_w{}^*$ obtained by the d, q/three-phase conversion unit 8. The PWM inverter 9 both provides these voltages to the IPMSM 10 and inputs the three-phase, i.e. u-phase, v-phase, and w-phase current values $i_u$, $i_v$, and $i_w$ provided to the IPMSM 10 into the three-phase/d, q conversion unit 11.

The IPMSM 10 is a type of synchronous motor that rotates with permanent magnets embedded therein. The direction of the magnetic flux created by the permanent magnets is the d-axis, and a direction at 90° thereto in terms of electrical angle is the q-axis. In an IPMSM type motor, not only magnet torque but also reluctance torque can be used, and therefore by allowing an appropriate d-axis current to flow in accordance with a torque command, motor efficiency can be improved.

The IPMSM 10 generates output in accordance with the three-phase voltage values $v_u$, $v_v$, and $v_w$ provided by the PWM inverter 9 and rotationally drives the compressor CMP as a load.

In the present embodiment, the compressor CMP is a rotary vane compressor, used in an automobile air conditioner, that compresses refrigerant gas and sends the compressed gas downstream to a non-illustrated condenser. The remaining structure of an automobile air conditioner is well-known, and a description thereof is thus omitted.

The three-phase/d, q conversion unit 11 converts the three-phase current values $i_u$, $i_v$, and $i_w$ output by the PWM inverter 9 and provided to the armature of the IPMSM 10 into d, q-axis current values $i_d$ and $i_q$. The three-phase/d, q conversion unit 11 then inputs these values into the subtractor 6 and the magnetic flux observer 13 of the rotation speed estimation unit 12.

In the above structure, the subtractor 2, peak filter 3, speed PI control unit 4, current vector control unit 5, subtractor 6, current PI/decoupling control unit 7, and d, q/three-phase conversion unit 8 correspond to the drive command signal generation unit of the present invention.

The rotation speed estimation unit 12 includes the magnetic flux observer 13, an angle error calculation unit 14, a speed calculation unit 15, a peak filter 16, and a subtractor 17.

With position sensorless control, since the d-q axes cannot actually be obtained directly, arbitrary γ-δ axes are established with respect to the original d-q axes, and current control and speed control are performed on these hypothetical axes.

Accordingly, an angle estimation error $\theta_{e\_est}$ exists between the γ-δ axes and the d-q axes. Therefore, for position sensorless control, an estimation algorithm is established from the above magnetic flux observer 13 to the speed calculation unit 15 so that, using the above voltage and current information, the angle estimation error $\theta_{e\_est}$ will rapidly converge to zero.

Based on the d-axis and q-axis command voltage values $v_d{}^*$ and $v_q{}^*$ input from the current PI control/decoupling control unit 7 and armature current values $i_d$ and $i_q$ input from the three-phase/d, q conversion unit 11, the magnetic flux observer 13 uses an equivalent mathematical model of the IPMSM 10 to calculate motor current magnetic flux estimated errors $\Delta\lambda_\gamma$ and $\Delta\lambda_\delta$ on the γ-δ axes. These motor current magnetic flux estimated errors $\Delta\lambda_\gamma$ and $\Delta\lambda_\delta$ on the γ-δ axes are input into the angle error calculation unit 14.

Using the motor current magnetic flux estimated errors $\Delta\lambda_\gamma$ and $\Delta\lambda_\delta$ on the γ-δ axes input from the magnetic flux observer 13, the angle error calculation unit 14 performs angle estimation error calculation to calculate the angle estimation error $\theta_{e\_est}$. The angle error calculation unit 14 then inputs the result into the speed calculation unit 15 and the peak filter 16.

Note that the angle error calculation unit 14 corresponds to the error calculation unit of the present invention.

Using the angle estimation error $\theta_{e\_est}$ input from the angle error calculation unit 14, the speed calculation unit 15 performs PI control and calculates a motor estimated rotation speed $\omega_{\_est}$, inputting the result into the subtractor 17.

The peak filter 16, on the other hand, applies gain to the angle estimation error $\theta_{e\_est}$ input from the angle error calculation unit 14 to obtain a suppression signal. In this case, the peak filter 16 is added in parallel with the speed calculation unit 15. The peak filter 16 inputs the suppression signal into the subtractor 17.

Note that the peak filter 16 corresponds to the first peak filter and the estimated corrected rotation speed calculation unit of the present invention.

The subtractor 17 subtracts the suppression signal obtained by the peak filter 16 from the motor estimated rotation speed $\omega\_{est}$ calculated by the speed calculation unit 15 to yield the motor estimated corrected rotation speed $\omega_{a\_est}$. The subtractor 17 then inputs this value into the subtractor 2 and the integrator 18.

The integrator 18 functions as a position calculation unit (rotation position estimation unit) and integrates the motor estimated corrected rotation speed $\omega_{a\_est}$ input from the subtractor 17 over time to yield the estimated angle $\theta\_{est}$. The integrator 18 then inputs this value into the three-phase/d, q conversion unit 11 and the d, q/three-phase conversion unit 8.

Operations of the electric motor control device of Embodiment 1 with the above structure are described below.

Using a user-set temperature, the temperature in the vehicle interior, and the like, the motor command rotation speed (target rotation speed) $\omega_m^*$ of the IPMSM 10 is set in the target rotation speed setting unit 1. In the subtractor 2, the motor estimated corrected rotation speed $\omega_{a\_est}$ obtained by the subtractor 17 of the rotation speed estimation unit 12 is subtracted from the target rotation speed $\omega_m^*$ to calculate the rotation speed difference, i.e. the error, which is input into the peak filter 3 and the speed PI control unit 4.

The speed PI control unit 4 performs PI control based on the motor estimated corrected rotation speed $\omega_{a\_est}$, and while eliminating steady-state error through the integration operation, applies a proportional gain to yield the command motor current value $i_\alpha^*$. The command motor current value $i_\alpha^*$ is converted in the current vector control unit 5 into the d-axis and q-axis command current values $i_d^*$ and $i_q^*$ and subsequently input into the subtractor 6.

On the other hand, the peak filter 3 calculates a correction amount for the q-axis command current value in order to reduce the periodic fluctuation component of the speed error value, inputting the correction amount into the subtractor 6.

The current error obtained by the subtractor 6 is transmitted to the current PI control/decoupling control unit 7 where it undergoes PI control to become the d-axis and q-axis command voltage values $v_d^*$ and $v_q^*$, which are input into the d, q/three-phase conversion unit 8 and the magnetic flux observer 13 of the rotation speed estimation unit 12.

The d, q/three-phase conversion unit 8 performs two-phase to three-phase conversion to convert the d-axis and q-axis command voltage values $v_d^*$ and $v_q^*$ input from the current PI control/decoupling control unit 7 into the command current values $v_u^*$, $v_v^*$, and $v_w^*$, inputting these values into the PWM inverter 9.

The PWM inverter 9 creates three-phase, i.e. u-phase, v-phase, and w-phase, voltage values $v_u$, $v_v$, and $v_w$ from the command voltage values $v_u^*$, $v_v^*$, and $v_w^*$ input from the d, q/three-phase conversion unit 8 and provides the created values to the IPMSM 10.

The IPMSM 10 rotates at the target rotation speed due to the voltage values $v_u$, $v_v$, and $v_w$ and drives the compressor CMP.

On the other hand, the three-phase/d, q conversion unit 11 converts the three-phase current values into the d-axis current $i_d$ and the q-axis current $i_q$.

In the present invention, and therefore in the present embodiment, in order to estimate the rotation speed of the IPMSM 10 with the rotation speed estimation unit 12, the electric motor control device first calculates error related to rotation of the IPMSM 10. Using this error, the peak filter 16 can be applied, allowing for an improvement in the estimation accuracy of the estimated rotation speed and a suppression of periodic speed fluctuation at a high frequency.

In the present embodiment, angle error is used as the error related to rotation.

For this purpose, based on the current values $i_d$ and $i_q$ on the d and q axes input from the three-phase/d, q conversion unit 11 and the d-axis and q-axis command voltage values $v_d^*$ and $v_q^*$ input from the current PI control/decoupling control unit 7, the magnetic flux observer 13 performs identification using a mathematical model for the IPMSM 10. In this way, the magnetic flux observer 13 calculates the motor current magnetic flux estimated errors $\Delta\lambda_\gamma$ and $\Delta\lambda_\delta$ on the γ-axis and δ-axis and inputs these errors into the angle error calculation unit 14.

Based on the motor current magnetic flux estimated errors $\Delta\lambda_\gamma$ and $\Delta\lambda_\delta$ input from the magnetic flux observer 13, the angle error calculation unit 14 performs angle estimation error calculation. In this way, the angle error calculation unit 14 calculates the angle estimation error $\theta_{e\_est}$ and inputs the result into the speed calculation unit 15 and the peak filter 16.

Based on the angle estimation error $\theta_{e\_est}$ input from the angle error calculation unit 14, the speed calculation unit 15 performs PI control to obtain the motor estimated rotation speed $\omega\_{est}$, inputting the result into the subtractor 17.

On the other hand, based on the angle estimation error $\theta_{e\_est}$ input from the angle error calculation unit 14, the peak filter 16 inserted in parallel with the speed calculation unit 15 generates a suppression signal with gain adjusted to match the vibration frequency, inputting the result into the subtractor 17.

In the subtractor 17, the suppression signal generated by the peak filter 16 is subtracted from the motor estimated rotation speed $\omega\_{est}$ input from the speed calculation unit 15 to yield the motor estimated corrected rotation speed $\omega_{a\_est}$ from which the periodic speed fluctuation component has been removed. This motor estimated corrected rotation speed $\omega_{a\_est}$ is input into the subtractor 2 and the integrator 18.

The integrator 18 functions as the rotation position estimation unit and obtains the estimated angle $\theta\_{est}$ by integrating the motor estimated corrected rotation speed $\omega_{a\_est}$. The integrator 18 then inputs this value into the three-phase/d, q conversion unit 11 and the d, q/three-phase conversion unit 8.

Next, the improvement effect achieved by the peak filter 16 in the electric motor control device of Embodiment 1 is described with reference to FIGS. 2A, 2B, 3, 4A to 4C, 5, 6A to 6D, 7A, and 7B. In FIGS. 2A, 2B, 4C, 7A, and 7B, the horizontal and vertical axes respectively represent time [s] and rotation speed [rpm]. Furthermore, in FIGS. 2A, 2B, 4C, 7A, and 7B, the dashed line, solid line, and alternate long and short dash line (figures other than FIG. 4C) respectively represent the estimated value, true value, and target value. In FIGS. 4A, 6A, and 6C, the horizontal and vertical axes respectively represent frequency [Hz] and gain [dB], and in FIGS. 4B, 6B, and 6D, the horizontal and vertical axes respectively represent frequency [Hz] and phase [deg].

Figure 2A:
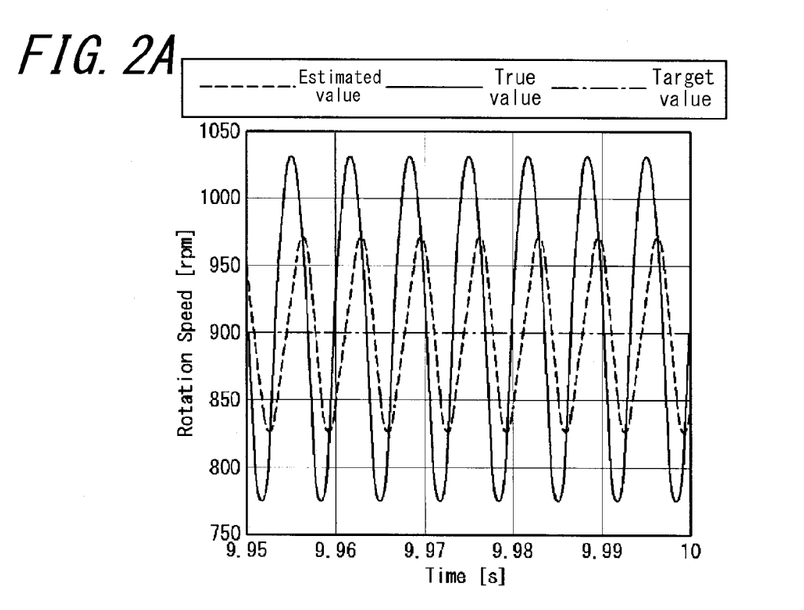
FIG. 2A illustrates the time/rotation speed relationship, comparing a target value, true value, and estimated value in a control device without a peak filter.

First, for a structure similar to FIG. 1 yet with neither the peak filter 3 nor the peak filter 16, the true value deviates greatly from the target value with an amplitude of 130 rpm, as shown in FIG. 2A.

Figure 2B:
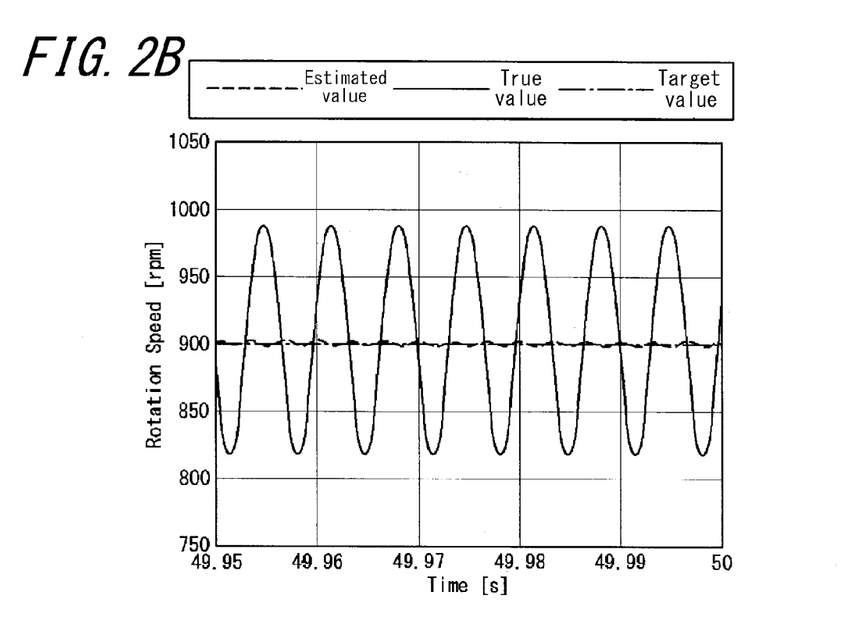
FIG. 2B illustrates the time/rotation speed relationship, comparing a target value, true value, and estimated value in a control device having only the second peak filter.

On the other hand, for a structure similar to FIG. 1 with only the peak filter 3 and no peak filter 16, the estimated value matches the target value, yet the true value is far off from the target value with an amplitude of 85 rpm, as shown in FIG.

2B. Accordingly, the accuracy of the true value is low, and there is room for improvement in suppressing fluctuation of the true value. The peak filter 3 alone is not a sufficient measure, and another correction means that can improve accuracy of the true value is necessary.

Figure 3:
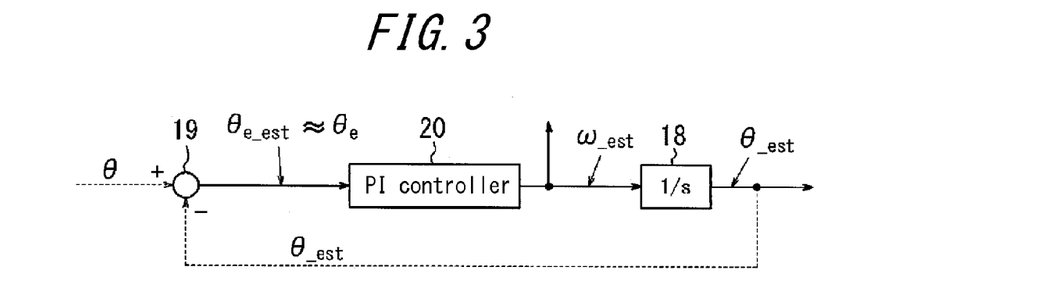
FIG. 3 is an equivalent block diagram of speed/position estimation for the case of no first peak filter.
Figure 4A:
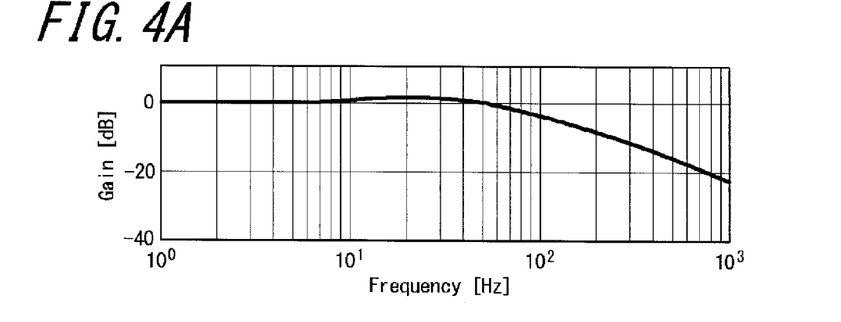
FIG. 4A illustrates frequency characteristics in the equivalent block diagram of FIG. 3.

FIG. 3 is an equivalent block diagram of speed/position estimation by the rotation speed estimation unit 12 in FIG. 1 for a structure that calculates the angle estimation value using the angle error θe calculated by angle error calculation and that has no peak filter 16.

Such a closed loop transfer function is provided by the following equation.

$$\frac{\theta\_est}{\theta} = \frac{s\theta\_est}{s\theta} = \frac{\omega\_est}{\omega} = \frac{K_{p\theta}s + K_{i\theta}}{s^2 + K_{p\theta}s + K_{i\theta}}$$
$$\approx \frac{4/3}{(1/\alpha)s + 1}$$

$$K_{p\theta} = \frac{4}{3}\alpha$$

$$K_{i\theta} = \frac{1}{3}\alpha^2$$

In this equation, $K_{p\theta}$ and $K_{i\theta}$ are respectively the proportional gain and integral gain of a PI controller 20. As shown in the equation, $1/\alpha$ is a time constant for the time lag of speed/position estimation. The value of a is set to any value such that the angle estimation error is reduced.

Figure 4B:
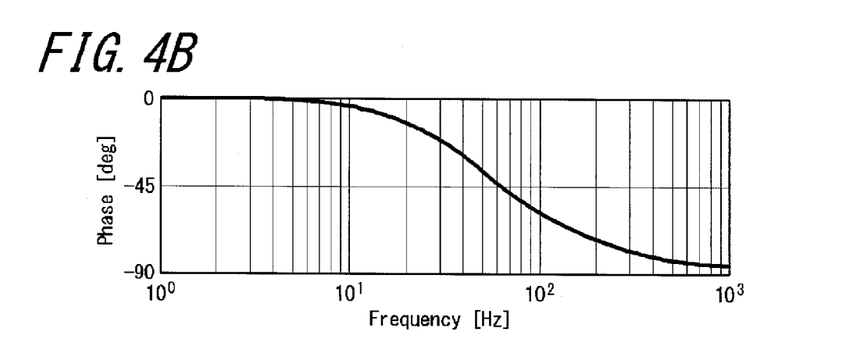
FIG. 4B illustrates frequency characteristics in the equivalent block diagram of FIG. 3.
Figure 4C:
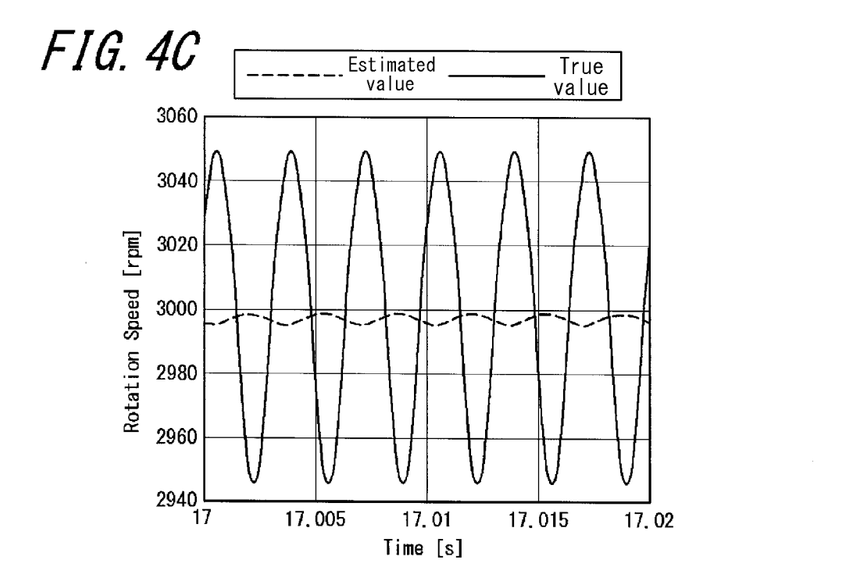
FIG. 4C illustrates the time/rotation speed relationship in the equivalent block diagram of FIG. 3.

FIGS. 4A, 4B, and 4C illustrate the frequency characteristics of the block diagram in FIG. 3 and the evaluation results. FIG. 4A is a frequency/gain diagram, FIG. 4B is a frequency/phase diagram, and FIG. 4C illustrates comparison of the true and estimated values of the rotation speed.

As is clear from FIGS. 4A and 4B, in the frequency range in which rotation synchronous vibration is to be suppressed (a frequency range higher than 100 Hz), the gain is lower, and therefore an accurate estimation cannot be made.

As illustrated in FIG. 4C, during vibration at 300 Hz, the difference in amplitude between the true value and the estimated value is large.

Figure 5:
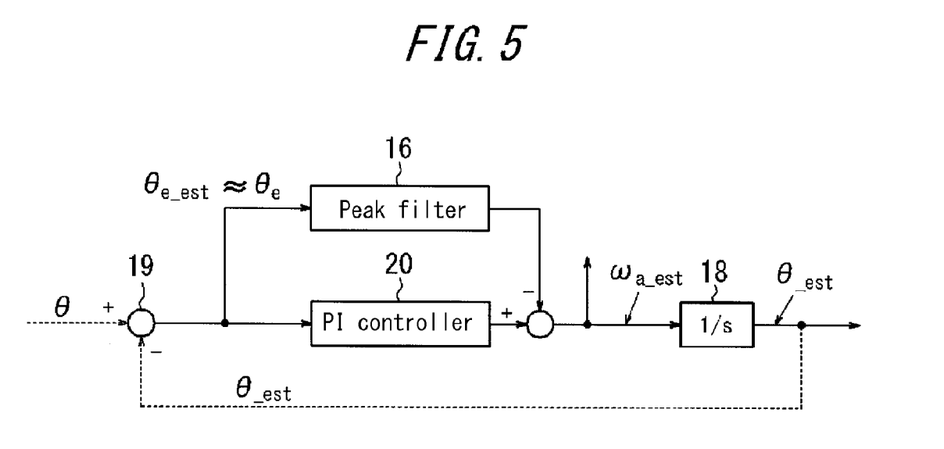
FIG. 5 is a block diagram for the case when the first peak filter is added to the equivalent block diagram of FIG. 3.
Figure 6A:
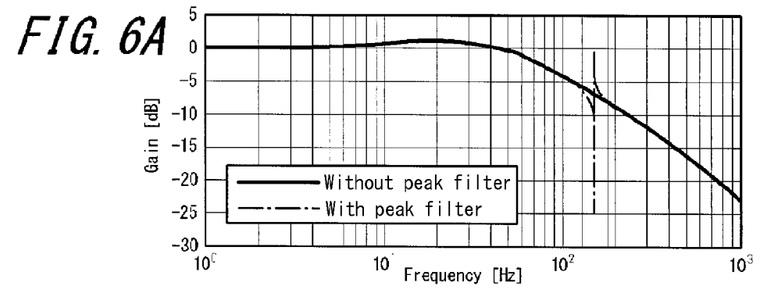
FIG. 6A illustrates frequency characteristics in the block diagram of FIG. 5.

Therefore, as illustrated in FIG. 5, the peak filter 16 is additionally inserted in parallel with the PI controller 20 in the block diagram of FIG. 3.

Figure 6B:
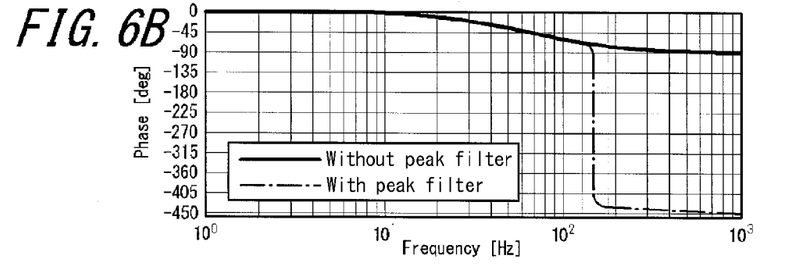
FIG. 6B illustrates frequency characteristics in the block diagram of FIG. 5.
Figure 6C:
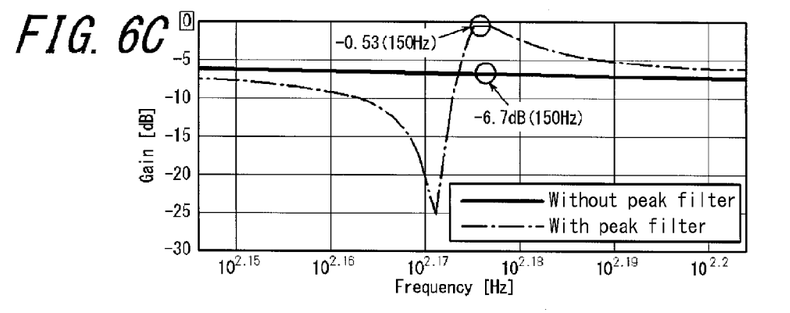
FIG. 6C illustrates frequency characteristics in the block diagram of FIG. 5.
Figure 6D:
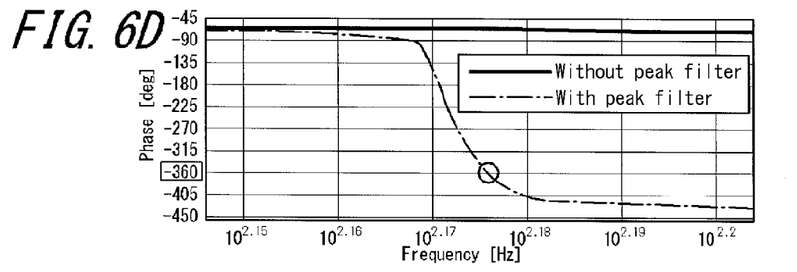
FIG. 6D illustrates frequency characteristics in the block diagram of FIG. 5.

The frequency characteristics for this case are shown by the alternate long and short dash line in FIGS. 6A and 6B. Furthermore, FIGS. 6C and 6D are expanded views near 140 Hz to 160 Hz in FIGS. 6A and 6B. Note that the solid lines in FIGS. 6A to 6D are the results for when no peak filter 16 is inserted.

As is clear from these figures, at a vibration frequency of 150 Hz, the gain is nearly 0 dB, and the phase is nearly −360 deg. This shows that this frequency can be accurately estimated.

Figure 7A:
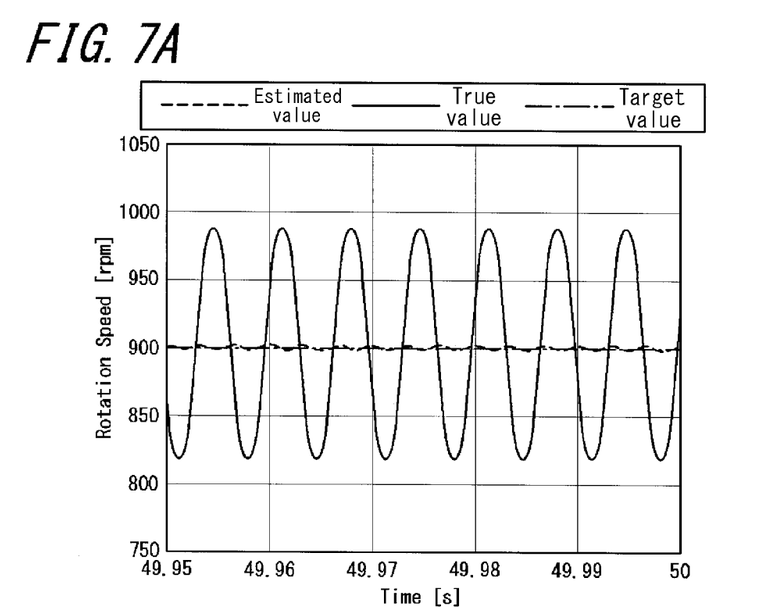
FIG. 7A illustrates the time/rotation speed relationship, comparing a target value, true value, and estimated value in a control device with no first peak filter.
Figure 7B:
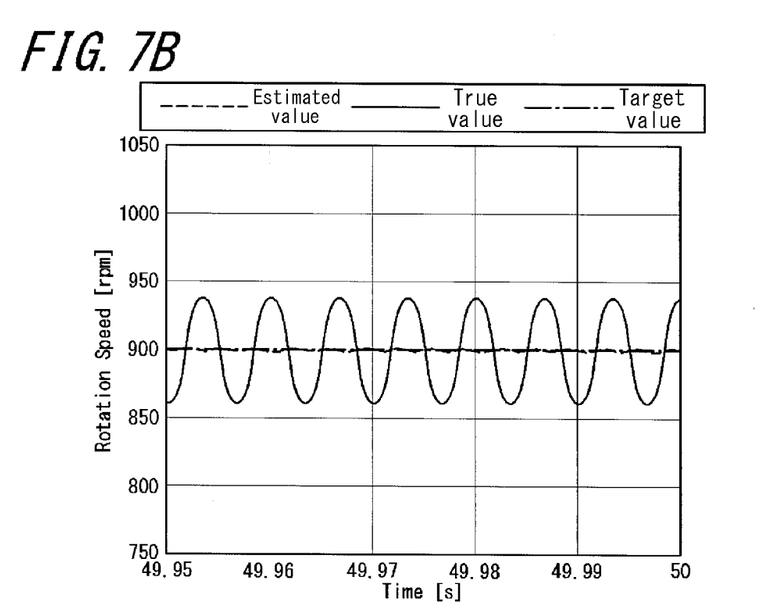
FIG. 7B illustrates the time/rotation speed relationship, comparing a target value, true value, and estimated value in an electric motor control device according to Embodiment 1.

As illustrated in FIG. 7A, when no peak filter 16 is inserted, the true value deviates greatly from the estimated value, with an amplitude of 85 rpm. By contrast, when the peak filter 16 is inserted as in the present embodiment, the true value approaches the target value, with a small amplitude of 38.78 rpm between the true value and the target value, as illustrated in FIG. 7B. As a result, the rotational fluctuation of the true value can be suppressed more than in the conventional example.

As is clear from the above explanation, in the electric motor control device of Embodiment 1, the peak filter 16 is inserted in parallel with the speed calculation unit 15, into which the angle estimation error $\theta_{e\_est}$ calculated by the angle error calculation unit 14 of the rotation speed estimation unit 12 is input. In the subtractor 17, the suppression signal of the peak filter 16 is subtracted from the motor estimated rotation speed $\omega\__{est}$, which is the output of the speed calculation unit 15, to yield the motor estimated corrected rotation speed $\omega_{a\_est}$. In this way, the effects of periodic speed fluctuation can be suppressed to allow for highly accurate estimation of the rotation speed.

As a result, the occurrence of vibration and noise can be reduced in a high frequency range.

Furthermore, since the peak filter 3 is inserted in parallel with the speed PI control unit 4 and the current vector control unit 5, periodic fluctuation of the rotation speed can be suppressed.

Embodiment 2

Next, Embodiment 2 is described. In the description of Embodiment 2, structural components similar to Embodiment 1 are not illustrated or are labeled with the same reference signs, and a description thereof is omitted. Only the differences are described.

The overall structure of an electric motor control device according to Embodiment 2 of the present invention is described based on the attached drawings.

Figure 8:
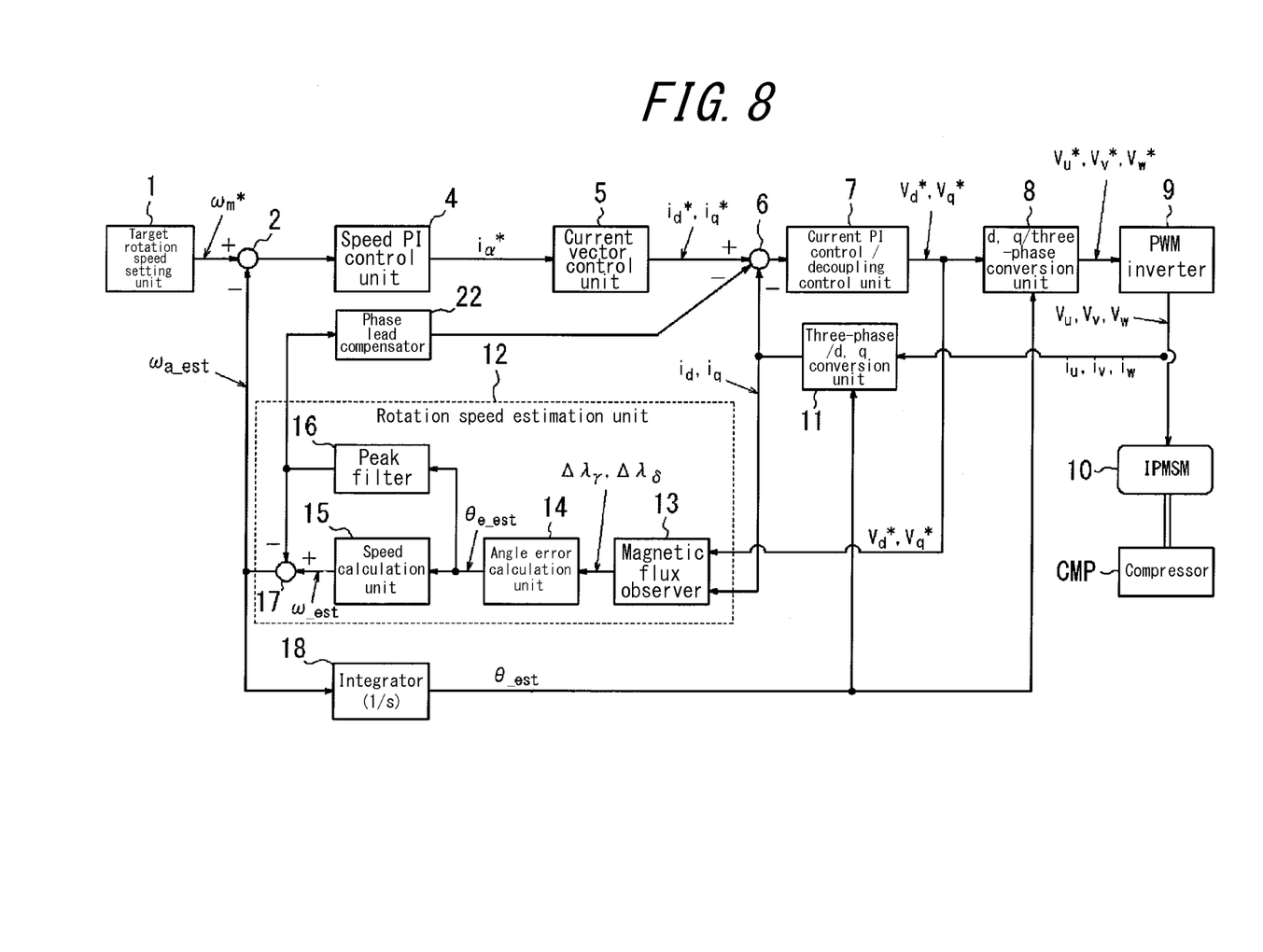
FIG. 8 is a functional block diagram of an electric motor control device according to Embodiment 2 of the present invention.

The electric motor control device of Embodiment 2 differs from Embodiment 1 by not including the peak filter 3 of Embodiment 1, by the addition of a phase lead compensator 22, and by a resulting change to the subtractor 6.

In Embodiment 2, as illustrated in FIG. 8, a signal adjusted for phase and amplitude with respect to the rotation speed estimated value correction amount calculated in the peak filter 16 is used instead of the signal calculated by the peak filter 3 in Embodiment 1. The values calculated by the peak filters 16 and 3 are both signals generated due to a periodic load fluctuation occurring in the compressor, and the period for both signals matches the load fluctuation period of the compressor.

Accordingly, by adjusting the phase and amplitude using the signal of the peak filter 16, it is possible to generate a signal corresponding to the signal calculated by the peak filter 3 of Embodiment 1. This generation means is not limited to a phase lead compensator and may, for example, be a phase lag compensator or a calculation means that stores an input signal and outputs the signal by applying a predetermined gain after a predetermined time has elapsed.

The remaining structure is similar to Embodiment 1.

The transfer function of the phase lead compensator 22 is provided by the following equation, $$K_{ff} = k_{ff}\frac{\alpha T_{ff}s + 1}{T_{ff}s + 1}$$

where $k_{ff}$, $T_{ff}$, and $\alpha$ are chosen to yield gain and phase characteristics such that the disturbance is rejected.

Figure 9A:
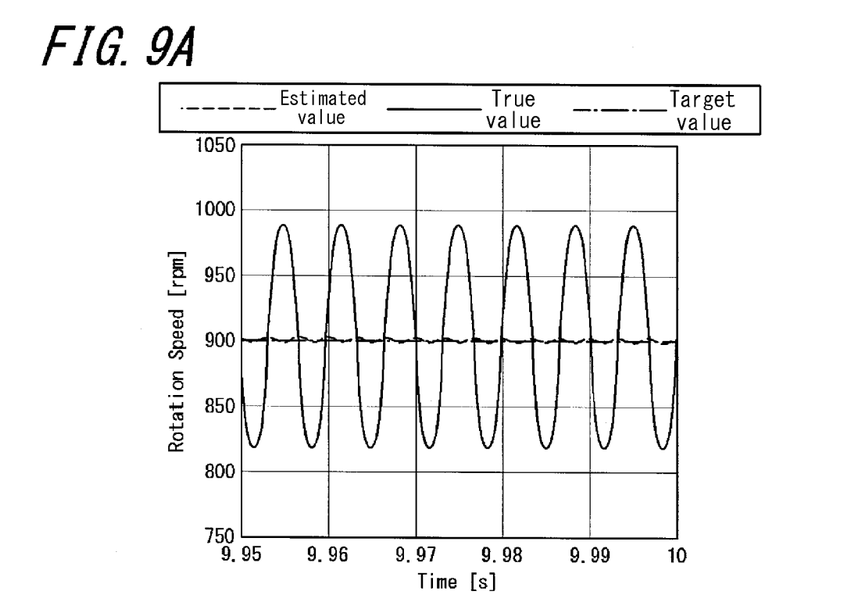
FIG. 9A illustrates the time/rotation speed relationship, comparing a target value, true value, and estimated value in a control device with no first peak filter.
Figure 9B:
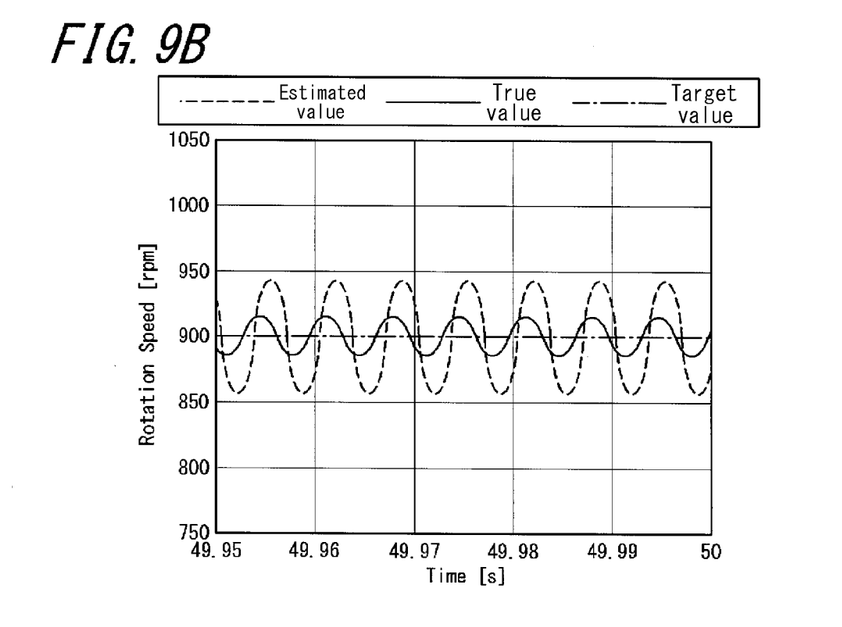
FIG. 9B illustrates the time/rotation speed relationship, comparing a target value, true value, and estimated value in an electric motor control device according to Embodiment 2.

FIG. 9A illustrates the time/rotation speed relationship for the case of no peak filter 16 (the same as FIG. 7A), and FIG. 9B illustrates the time/rotation speed relationship for the case of adding the phase lead compensator 22 of the present embodiment (with a peak filter 16). In FIGS. 9A and 9B, the horizontal and vertical axes respectively represent time [s] and rotation speed [rpm]. Furthermore, in FIGS. 9A and 9B, the dashed line, solid line, and alternate long and short dash line respectively represent the estimated value, true value, and target value.

As is clear from these figures, in the electric motor control device of Embodiment 2, the true value approaches the target value, with a small amplitude of 14.95 rpm.

Accordingly, with the electric motor control device of Embodiment 2, the effect of periodic speed fluctuation can be suppressed, and noise and vibration can be reduced.

The present invention has been described based on the above embodiments, yet the present invention is not limited to these embodiments and includes any design modification or the like within the spirit and scope of the present invention.

For example, according to the present invention, the phase lead compensator 22 of Embodiment 2 need not employ phase lead as long as it has gain and phase characteristics such that the disturbance can be rejected.

Furthermore, the electric motor control device of the present invention is not limited to an automobile air conditioner and may be used in a different device or system.

REFERENCE SIGNS LIST

CMP: Compressor
1: Target rotation speed setting unit
2, 6: Subtractor (drive command signal generation unit)
3: Peak filter (drive command signal generation unit, second peak filter)
4: Speed PI control unit (drive command signal generation unit)
5: Current vector control unit (drive command signal generation unit)
7: Current PI control/decoupling control unit (drive command signal generation unit)
8: d, q/three-phase conversion unit (drive command signal generation unit)
9: PWM inverter
10: IPMSM
11: Three-phase/d, q conversion unit
12: Rotation speed estimation unit
13: Magnetic flux observer
14: Angle error calculation unit (error calculation unit)
15: Speed calculation unit
16: Peak filter (estimated corrected rotation speed calculation unit, first peak filter)
17, 19: Subtractor
18: Integrator
20: PI controller
21: Integrator
22: Phase lead compensator

The invention claimed is:

1. An electric motor control device comprising:
a target rotation speed setting unit configured to set a target rotation speed of an electric motor;
a rotation speed estimation unit configured to calculate an estimated corrected rotation speed of the electric motor; and
a drive command signal generation unit coupled to the target rotation speed setting unit and the rotation speed estimation unit and configured to generate a drive command signal for the electric motor so as to eliminate a rotation speed difference between the target rotation speed set by the target rotation speed setting unit and the estimated corrected rotation speed calculated by the rotation speed estimation unit,
the rotation speed estimation unit including:
an error calculation unit configured to calculate an angle estimation error related to rotation of the electric motor;
a speed calculation unit configured to calculate an estimated rotation speed of the electric motor based on the angle estimation error calculated by the error calculation unit;
an estimated corrected rotation speed calculation unit in which a first peak filter is used to calculate a correction value based on the angle estimation error calculated by the error calculation unit,
wherein the estimated corrected rotation speed calculated by the rotation speed estimation unit is calculated based on the estimated rotation speed calculated by the speed calculation unit and the correction value calculated by the estimated corrected rotation speed calculation unit.

2. The electric motor control device according to claims 1, wherein
the drive command signal generation unit includes a second peak filter taking a rotation speed difference between the target rotation speed and the estimated corrected rotation speed as input.

3. The electric motor control device according to claim 1, wherein
the first peak filter applies gain to the angle estimation error calculated by the error calculation unit to calculate the correction value.

4. The electric motor control device according to claim 3, wherein
the gain is adjusted to match a vibration frequency in a range higher than 100 Hz of the electric motor.

5. The electric motor control device according to claim 1, wherein
the rotation speed estimation unit further includes a magnetic flux observer using an equivalent mathematical model of the electric motor to calculate motor current magnetic flux estimated errors, and
the error calculation unit calculates the angle estimation error based on the motor current magnetic flux estimated errors calculated by the magnetic flux observer.

6. The electric motor control device according to claim 1, wherein
the rotation speed estimation unit further includes a subtractor calculating the estimated corrected rotation speed by subtracting the correction value calculated by the first peak filter from the estimated rotation speed calculated by the speed calculation unit.

* * * * *